G. CONSTANTINESCO.
SYNCHRONOUS ALTERNATING LIQUID CURRENT MOTOR.
APPLICATION FILED AUG. 25, 1921.
1,432,673.
Patented Oct. 17, 1922.
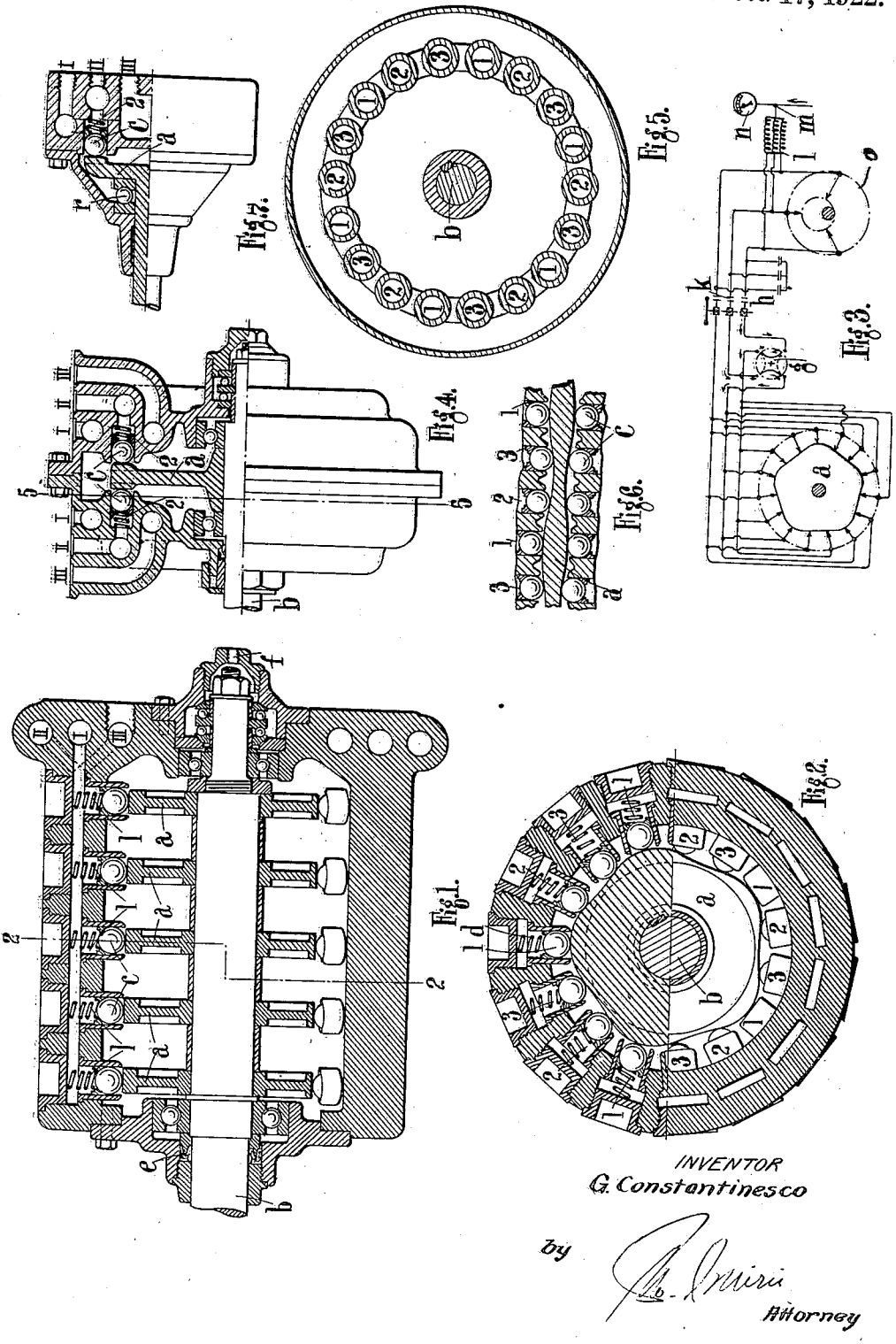
INVENTOR
G. Constantinesco Patented Oct. 17, 1922.

1,432,673

UNITED STATES PATENT OFFICE.

GEORGE CONSTANTINESCO, OF WEYBRIDGE, ENGLAND, ASSIGNOR TO WALTER HADDON, OF LONDON, ENGLAND.

SYNCHRONOUS ALTERNATING LIQUID CURRENT MOTOR.

Application filed August 25, 1921. Serial No. 495,222.

(GRANTED UNDER THE PROVISIONS OF THE ACT OF MARCH 3, 1921, 41 STAT. L., 1313.)

*To all whom it may concern:*

Be it known that I, GEORGE CONSTANTINESCO, a subject of the King of Great Britain and Ireland, residing at Weybridge, Surrey, England, have invented certain new and useful Improvements in Synchronous Alternating Liquid Current Motors (for which I have filed an application in Great Britain Oct. 3, 1916, Patent No. 110,005), of which the following is a specification.

The present invention relates to alternating liquid current motors and especially to motors for use in wave transmission systems, and has for its object the production of a synchronous rotary motor running at a speed differing from that of the generator and actuated by a polyphase alternating liquid current. The term alternating liquid current is defined in the specification of Patent No. 1,334,290.

In Letters Patent Reissue No. 14,738 it is shown how energy can be transmitted from one point to another by means of a series of periodic variations of pressure and volume, travelling along one or more liquid columns. For example, if a motor is formed by three cylinders and pistons placed at 120° apart, the pistons differing in phase of motion also by 120°, such a motor will be kept rotating by the pulsations of a three-phase liquid wave transmission line fed by a similar generator. This is the simplest form of synchronous motor.

A motor of the type described would be very difficult to start, and would be incapable of starting against an inertia fixed on the shaft, as the effects of inertia increase considerably with the speed, and would prevent starting where the synchronous speed is high.

The object of the present invention is to obtain a synchronous alternating liquid current motor running at a very much lower speed than the speed of the generator.

The invention consists in a valveless alternating liquid current motor comprising three groups of pistons in cylinders, each group being connected by suitable connections to one of three liquid columns, the group being arranged around the motor in such a manner that the movements of the different groups differ by 120° in phase, while the rotor is so shaped that the pistons reciprocating in contact with it move with a simple harmonic motion as the rotor revolves.

The invention also consists in a valveless polyphase alternating liquid current motor so constructed that the speed of the rotor is different from the speed of the generator.

It will be readily seen that such a machine may either act as a motor or generator according as the power is applied to rotate the shaft or to the movement of the liquid columns acting on the shaft.

The invention further consists in constructing the apparatus in such a manner that the speed of the rotor is a sub-multiple of the speed of the generator.

The invention also consists in the improved motors hereinafter described.

It has been proposed in a gas engine to reduce the speed of rotation of the driven shaft relative to the piston speed by causing the pistons to act through links on inclined surfaces on the inner surface of a ring moving with the driven shaft. It has also been proposed in fluid pressure engines with distributing valves to cause the pistons to act on cam surfaces designed to move the shaft through a part only of a revolution during one complete reciprocation of a piston.

It will be seen that if the rotor is shaped in such a manner that for one revolution of the rotor there are M reciprocations of each of the pistons, and if the rotor is fed from a three or more phase transmission line in which the frequency is N, the frequency of the revolutions of the motor will be $\frac{N}{M}$ so that the gearing ratio resulting is $\frac{1}{M}$.

A reversing valve may be introduced between the generator and the motor, and condensers having inertias may be employed in the line as described in the specification of Letters Patent Reissue No. 14,738.

Referring to the accompanying drawings:—

Figure 1 is an axial section and

Figure 2 is a section on the line 2—2, Figure 1, of a motor constructed according to the invention.

Figure 3 is a diagram showing the method of connecting the synchronous motor, adapted to run at a reduced speed to a three-phase line.

Figure 4 is an axial section of a motor adapted to run at a reduced speed in which the pistons are arranged to act parallel to the axis of the motor.

Figure 5 is a section on the line 5—5 of Figure 4, while

Figure 6 is a developed section on the circumference of the rotor.

Figure 7 shows a construction adapted for small power motors.

In the form of the invention shown in Figures 1 and 2, the rotor comprises five similar discs $a$ carried on a shaft $b$, each of these discs being shaped as shown in Figure 2, so that for one revolution of the rotor the point of contact of the disc with one of the balls $c$ in the cylinders $d$ is displaced radially five times, so that the disc in rotating imparts to the ball $c$ a true harmonic displacement having a frequency five times as great as the number of revolutions of the shaft $b$. The balls $c$ in this machine act as pistons and fit in cups sliding in the cylinders $d$, springs being provided to balance their inertia. In this construction the ball is free to rotate so that there is rolling contact between the balls $c$ and discs $a$.

Any leakage which occurs past the balls is replaced by suitable appliances in the wave transmission line. As the leakage accumulates there is provided a leather cup or other suitable stuffing box $e$ to prevent the escape of the oil from the machine. The interior of the machine is connected through a return pipe $f$ to a collecting tank situated near the generator, so that a slow circulation of the leaking fluid is maintained. From the collecting tank a suitably arranged pump may be employed to pump the oil back into the three-phase transmission line.

In the motor illustrated the cylinders 1, 1, 1, 1, 1, communicate with a collecting channel I, the cylinders marked 2 and 3 respectively communicate with channels II, III. These three channels form closed rings communicating with the three pipes of the three-phase line leading from the generator. The connections are diagrammatically shown in Figure 3. In this figure there is diagrammatically shown at $g$ a reversing cock adapted to interchange the connections between two of the phases for the purpose of reversing the direction of rotation of the motor.

Three condensers are shown connected to the line at $h$, in order to take up the rise of pressure which would occur on reversing or when stopping the motor by closing the lines at $k$. Capacities such as the long steel vessel described in Patent No. 1,334,283 may be substituted for these condensers. The three phases of the transmission line may be connected as at $l$ to three small bore pipes, whose other ends are connected to a common point $m$. As there is no variation of the pressure at the point $m$, oil may be pumped in at this point at the mean working pressure, in order to compensate for leakage, so that check valves are dispensed with. A pressure gauge may be fitted at $n$ to indicate the mean pressure in the pipes.

The use of the small bore pipes $l$ has the advantage that it balances the mean pressure in the three-phase line as is necessary after each reversal. The pipes $l$ should be sufficiently long and of sufficiently small diameter to avoid any appreciable loss of power through heating.

The arrangement of pipes of small bore as above described affords a very simple method of feeding lines in order to keep the three-phase transmission line at a constant mean pressure, all that is necessary being to pump the fluid in by means of an ordinary constant pressure pump, regulating the flow from the pump according to the reading of the gauge $n$. The generator $o$ is shown diagrammatically connected to the lines on the right hand side of Figure 3.

In the form of the invention shown in Figures 4, 5 and 6 the speed of the motor is one-sixth of the transmission line frequency. In this modification the piston balls $c$ act parallel to the shaft $b$ instead of perpendicular to it as in the case of Figures 1, 2 and 3, and the discs $a$ are shaped at the sides of their circumference as illustrated in the developed view, Figure 6. The cylinders 1, 1, 1, etc., 2, 2, 2, etc., 3, 3, 3, etc., are connected to the conduits I, II, III in three groups as before. Moderate size motors can conveniently be constructed in this manner.

In the form of the invention shown in Figure 7 the cylinders 1, 1, 2, 2, etc., are only placed on one side of the disc $a$ which is shaped as before on this side only. The pressure of the pistons in this case is taken up by a thrust bearing $r$.

I claim:—

1. A valveless alternating liquid current motor comprising three groups of cylinders, pistons working in said cylinders, three liquid columns, each of said liquid columns being connected to a group of said cylinders, said groups of cylinders being arranged around the motor in such a manner that the movements of the three different groups of pistons differ from each other in phase by 120 degrees and a rotor so shaped that the pistons in contact with it move with a simple harmonic motion as set forth.

2. A valveless alternating liquid current motor, comprising three groups of cylinders, pistons working in said cylinders, three liquid columns, each of said liquid columns being connected to a group of said cylinders, said groups of cylinders being arranged around the motor in such a manner that the movements of the three different groups of pistons differ from each other in phase by 120 degrees, and a rotor so shaped that the pistons in contact with it move with a simple harmonic motion, said rotor operating in conjunction with each of said groups of pistons more than once during a complete revolution as set forth.

In testimony whereof I have signed my name to this specification.

GEORGE CONSTANTINESCO.

Witnesses:
W. F. M. ADAMS,
JONES G. ALLSOP.